(12) United States Patent
Feldman

(10) Patent No.: US 7,246,032 B2
(45) Date of Patent: Jul. 17, 2007

(54) MULTIMODE ELECTRONIC CALIPERS HAVING RATIOMETRIC MODE AND SIMPLIFIED USER INTERFACE

(75) Inventor: Mark Feldman, Redmond, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/595,408

(22) Filed: Nov. 10, 2006

(65) Prior Publication Data

US 2007/0055475 A1 Mar. 8, 2007

Related U.S. Application Data

(63) Continuation of application No. 10/978,158, filed on Oct. 30, 2004, now abandoned.

(51) Int. Cl.
*G01B 5/14* (2006.01)
(52) U.S. Cl. .................................................. 702/158
(58) Field of Classification Search ......... 702/157–158
See application file for complete search history.

(56) References Cited

U.S. PATENT DOCUMENTS

| | | |
|---|---|---|
| 4,879,508 A | 11/1989 | Andermo |
| 5,023,559 A | 6/1991 | Andermo |
| 5,053,715 A | 10/1991 | Andermo |
| 5,841,274 A | 11/1998 | Masreliez et al. |
| 5,886,519 A | 3/1999 | Masreliez et al. |
| 5,894,678 A | 4/1999 | Masreliez et al. |
| 5,973,494 A | 10/1999 | Masreliez et al. |
| 6,002,250 A | 12/1999 | Masreliez et al. |
| 6,011,389 A | 1/2000 | Masreliez et al. |
| 6,121,890 A | 9/2000 | Tetreault |
| 6,223,136 B1 * | 4/2001 | Geiger .................. 702/158 |
| 6,329,813 B1 | 12/2001 | Andermo |
| 6,497,051 B1 | 12/2002 | Poole et al. |

FOREIGN PATENT DOCUMENTS

| | | |
|---|---|---|
| JP | 3-68004 | 3/1991 |
| JP | 9-133502 | 5/1997 |
| JP | 2002-202119 A | 7/2002 |

* cited by examiner

*Primary Examiner*—Bryan Bui
*Assistant Examiner*—Jonathan Moffat
(74) *Attorney, Agent, or Firm*—Christensen O'Connor Johnson Kindness PLLC

(57) ABSTRACT

A multimode electronic measuring instrument is provided that includes a ratiometric mode of operation. During the ratiometric mode, a desired dimension is established as a stored reference dimension "$X_{ref}$". After the reference dimension is stored in memory, subsequent ratiometric measurement readouts will equal a current measurement distance "$X_{curr}$" divided by the reference dimension $X_{ref}$. A ratiometric measurement according to this invention indicates the relationship of a current dimension to another readily changed (reference) dimension. The ratiometric mode of operation can be implemented in combination with conventional function caliper functions to provide a multimode caliper having a simple and intuitive user interface. Setting the reference dimension and interpreting the ratiometric measurement display are particularly easy, to facilitate intuitive understanding and operation.

7 Claims, 5 Drawing Sheets

MULTIMODE ELECTRONIC CALIPERS HAVING RATIOMETRIC MODE AND SIMPLIFIED USER INTERFACE

FIELD OF THE INVENTION

The invention relates generally to electronic calipers, micrometers, digital scales, and similar length and angle measuring devices. More particularly, it relates to electronic calipers and the like that can be operated using a simplified control method to provide either ratiometric measurements or measurements in terms of conventional distance or angle units.

BACKGROUND

Most electronic calipers, dividers, and the like that are currently in use provide measurements only in conventional length or angle units such as inches, millimeters, degrees or radians. Furthermore, devices that provide such measurements, particularly in the case of commercially available electronic calipers, have become near-commodities. That is, the user-controlled functions provided, the number and spacing of the buttons provided to activate the functions, and the dimensions of the electronic housing and the LCD display portion, and the like, have settled into a narrow range of configurations that provide the manufacturability, economy, functionality, and ergonomic factors that are expected or required by a majority of manufacturers and users of electronic calipers. As such, manufacturers and users are reluctant to accept design variations which increase the functional complexity, increase the number of buttons or decrease their ergonomic spacing, increase the ergonomic dimensions of the electronic housing, or decrease the ergonomic visibility of LCD display elements, etc., even to a moderate extent.

Previously proposed methods for adding additional measurement functions to electronic calipers are generally not acceptable according to the aforementioned acceptance factors. For example, U.S. Pat. No. 6,223,136 to Geiger discloses a method wherein a scaling function is performed in one of two ways: numerical input or a calculated scaling factor. The numerical input is for cases where the drawings, model, or item to be measured is of a known scale. The user inputs that scale. Further measurements are then multiplied by this scale factor and displayed. The calculated scaling factor is for cases in which the user is uncertain of the scale, but has a reference dimension. In this case, the user measures the reference dimension, then inputs the value corresponding to the actual dimension of the object. The calculation module then calculates the scale factor and scales further measurements by the scale factor. It is suggested in the '136 Patent that an increment button, a decrement button, and a enter button are provided to allow the user to access and use the scaling, nominal value, basic geometric and complex geometric functions of the invention. However, such buttons are not conventionally provided on electronic calipers, and their addition and use would necessarily violate the acceptance criteria outlined above, as would the alternatives suggested in the '136 Patent.

U.S. Pat. No. 6,497,051 to Poole discloses a method for scaling a measurement wherein the user is able to select a scale by depressing a scale button. This feature is useful when the measurement to be taken is printed on a sheet drawn in a particular scale. In that case, the user uses the scale button to select the same scale used by the printout. When the measurement ends (the elements positioned to define the measurement distance) of the measuring device are placed on the printout to measure a distance, the CPU will automatically compensate for the scale and display an unscaled measurement. For example, if an MRI image of a person is printed in centimeters and uses a scale of one to four, the device can be set for taking measurements in centimeters and a scale of one to four. If a measurement of the size of an organ is taken where the measurement ends are spaced two centimeters apart on the MRI image, the CPU will automatically calculate the actual distance and display a measurement of eight centimeters on the display. The user is also able to calibrate the device to a known distance by separating the measurement ends to a known distance and the known distance is entered into the CPU by sending a calibration signal to the CPU. This is preferably accomplished by placing the measurement ends against a legend and pressing the calibration button. This will calibrate the measurement device to read precisely a calibrated distance (provided that the calibration operation using the calibration switch is properly coordinated with the scale setting operation using the scale switch). However, a scale switch is not conventionally provided on electronic calipers, nor is the ability to display the value of a scale currently in effect (without which, the current scale might easily be overlooked or mistaken), nor is it necessary to coordinate a calibration operation using a calibration switch with a scale setting operation using a scale switch. Thus, the addition and use of any such elements would necessarily violate the acceptance criteria outlined above, as would the alternatives suggested in the '051 Patent.

Nevertheless, the addition of a scaling-like measurement capability to an electronic caliper, or the like, would be useful. Thus, a configuration of an electronic caliper, or the like, that operates to provide a scaling-like measurement capability while generally satisfying the acceptance factors outlined above would be desirable.

SUMMARY

In order to satisfy most or all of the acceptance factors outlined above, a multimode electronic measuring instrument is provided that includes a ratiometric mode of operation. In various embodiments, during the ratiometric mode operation, the separation between two relatively moveable elements of the instrument (for example, the jaws of a caliper) is set to a dimension that is desired to be used as a reference dimension, and the dimension is established as a stored reference dimension "$X_{ref}$", by a user activating a reference dimension selecting element. After the reference dimension is stored in memory, subsequent measurement readouts on a numerical display, while operating in the ratiometric mode, will equal a current measurement distance "$X_{curr}$" (for example, a distance corresponding to the separation of the jaws of a caliper) divided by the reference dimension $X_{ref}$. That is, the displayed ratiometric measurement will be:

$$X_{ratio} = X_{curr}/X_{ref}$$

It should be appreciated that the ratiometric measurement provided according to the previous description is significantly different from "scaled" measurements and displays found in prior art instruments. Scaled measurements and displays are basically used to multiply an underlying dimensional measurement provided by a transducer of an instrument, by selected factor. In contrast, a ratiometric measurement according to this invention is particularly useful for comparing two dimensions. That is, the display indicates the relationship of a current dimension to another readily changed (reference) dimension, rather than just scaling the displayed value for a measured dimension.

The ratiometric mode of operation described above is implemented, in various embodiments, to provide using a simple and intuitive user interface, simple and intuitive setting of the reference dimension, and a ratiometric measurement display that is simple and intuitive to understand.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In the following descriptions, reference numbers generally having the same trailing digits refer to analogous or identical elements, unless otherwise indicated by description or context. As such, the description of one or more such similar elements will be understood to apply to other similar elements unless otherwise indicated by description or context.

Figure 1:
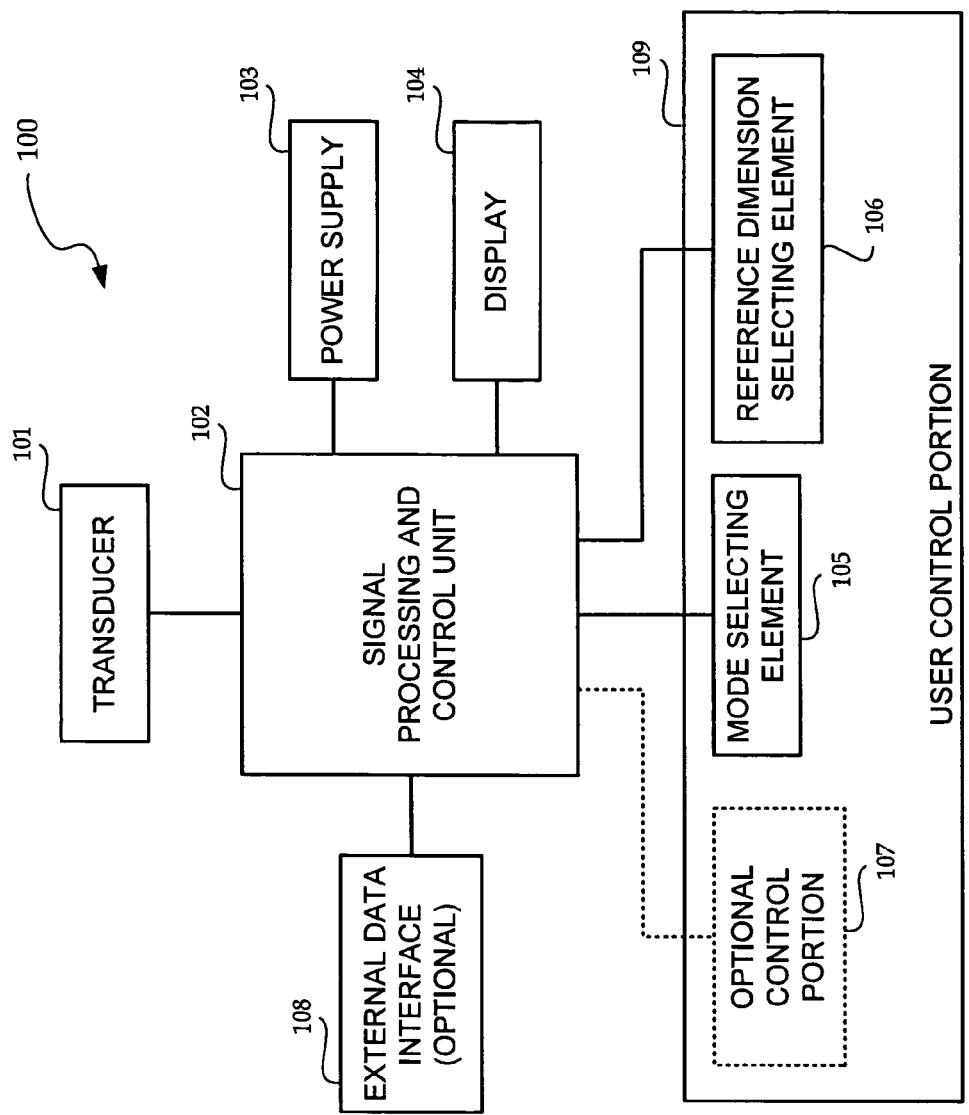
FIG. 1 is a block diagram showing one exemplary embodiment of a multimode measuring instrument system according to this invention.

FIG. 1 is a block diagram illustrating one exemplary embodiment of a multimode measuring instrument system 100 according to this invention. As shown in FIG. 1, the multimode measuring instrument system 100 includes a transducer 101, a signal processing and control unit 102, a power supply 103, a display 104, a user control portion 109, and may, optionally, include an external data interface 108 usable to connect the signal processing and control unit 102 to exchange control signals and/or measurement data with an external computer, or the like. The user control portion 109 includes a mode selecting element 105, a reference dimension selecting element 106, and an optional portion 107 that may include various other user control elements. In various applications, a physically independent display (not shown) displays information based on data received through the external data interface 108, and the local display 104 that is typically connected and assembled with the signal processing and control unit 102 may, optionally, be omitted in such applications.

The transducer 101 may comprise any convenient type of dimensional measurement transducer, including angular measurement transducers, or linear measurement transducers, or the like. When the multimode measuring instrument system 100 comprises a low-power, portable, handheld measurement device it is advantageous to use a capacitive or inductive transducer, such as those described in detail in U.S. Pat. Nos. 4,879,508, 5,023,559, 5,841,274, 5,894,678, 5,973,494, 6,002,250, and 6,011,389, for example, which are incorporated herein by reference in their entirety. Furthermore, in various embodiments, the transducer 101 comprises an "absolute measurement" type of transducer, such as those disclosed in U.S. Pat. Nos. 5,841,274, and 5,886,519, for example, which are incorporated herein by reference in their entirety. Certain operating advantages are provided when an absolute measurement type transducer is used in a multimode measuring instrument according to this invention, as outlined further below.

In various embodiments, the signal processing and control unit 102 may include a memory portion, a transducer signal processing portion, and a digital processing and control portion (not shown). In various embodiments the power supply 103 may comprise a solar cell, or a miniature 1.5 volt or 3 volt battery, or the like. The incorporated references include detailed descriptions of the design and operation of various components usable in a multimode measuring instrument system according to this invention, including components usable for the signal processing and control unit 102, and the power supply 103. In various embodiments, the display 104 may comprise a compact custom or dot-matrix LCD display. However, in general, now-known or later-developed type of display that provides the desired operating characteristics may be used. It will be appreciated that each of these components, as well as the additional components described below, may be interconnected by one or more data/control buses and/or application programming interfaces, or by direct connections between the various elements.

The user control portion 109 includes a reference dimension selecting element 106, a mode selecting element 105, and may include an optional portion 107 that may include various other user control elements, as described further below. The mode selecting element 105 allows the operator to determine or select the mode of operation of the multimode measuring instrument system 100. In particular, the mode selecting element 105 allows the user to select at least two modes of operation according to this invention. A first mode is a conventional measurement mode, wherein the multimode measuring instrument system 100 is usable to measure the dimensions of objects and display the measurement results in conventional units such as inches, millimeters, or other conventional or predetermined units. A second mode is a simplified ratiometric measurement mode, wherein the multimode measuring instrument system 100 is usable to measure the dimensions of objects and display the measurement results as a ratio between the dimension of the measured object and a previously determined reference dimension. In various embodiments, the mode selecting element 105 may be implemented, for example, as a button, a miniature touch screen element, a voice activated control circuit, or any other now-known or later developed miniature low power switching or selection element.

The reference dimension selecting element 106 allows the operator to determine or select a current reference dimension that is operative during the simplified ratiometric measurement mode of operation. In particular, according to this invention, the reference dimension selecting element 106 allows the user to trigger the input and storage of a current measured dimension corresponding to a current position of the transducer 101, in order to set a desired reference dimension. The reference dimension selecting element 106 may also, optionally, provide other functions, as outlined further below. In various embodiments, the reference dimension selecting element 106 may be implemented, for example, as a button, a miniature touch screen element, a voice activated control circuit, or any other now-known or later developed miniature low power switching or selection element.

Regarding operation, to operate in the ratiometric mode, the user activates the mode selecting element to set the signal processing and control unit to operate in the ratiometric mode. Then, if the desired reference dimension is not already set, the user sets the reference dimension using the reference dimension selecting element 106, which may be an element that provides other functions during other modes of operation, as described further below. Thereafter, for any position of the transducer, the corresponding dimension will be displayed on the display 104 as a number equal to the ratio of the dimension corresponding to the current position of the transducer to the reference dimension, that is, the current dimension divided by the reference dimension.

To operate in a conventional mode (for example, a mode that displays measurements in inches or millimeters), the user activates the mode selecting element 105 to set the signal processing and control unit to operate in the conventional mode. Thereafter, for any position of the transducer, the corresponding dimension will be displayed on the display 104 in conventional or predetermined units, such as inches or millimeters, for example. In various embodiments, the user may toggle between all the measurement/display modes of operation simply by repetitive activation, or toggling, of the mode selecting element 107.

It should be appreciated that a multimode measuring instrument that includes a simplified ratiometric measurement mode according to this invention, provides a simple and intuitive user interface, a simple and intuitive setting of the reference dimension, and a ratiometric measurement display that is simple and intuitive to understand.

Figure 2:
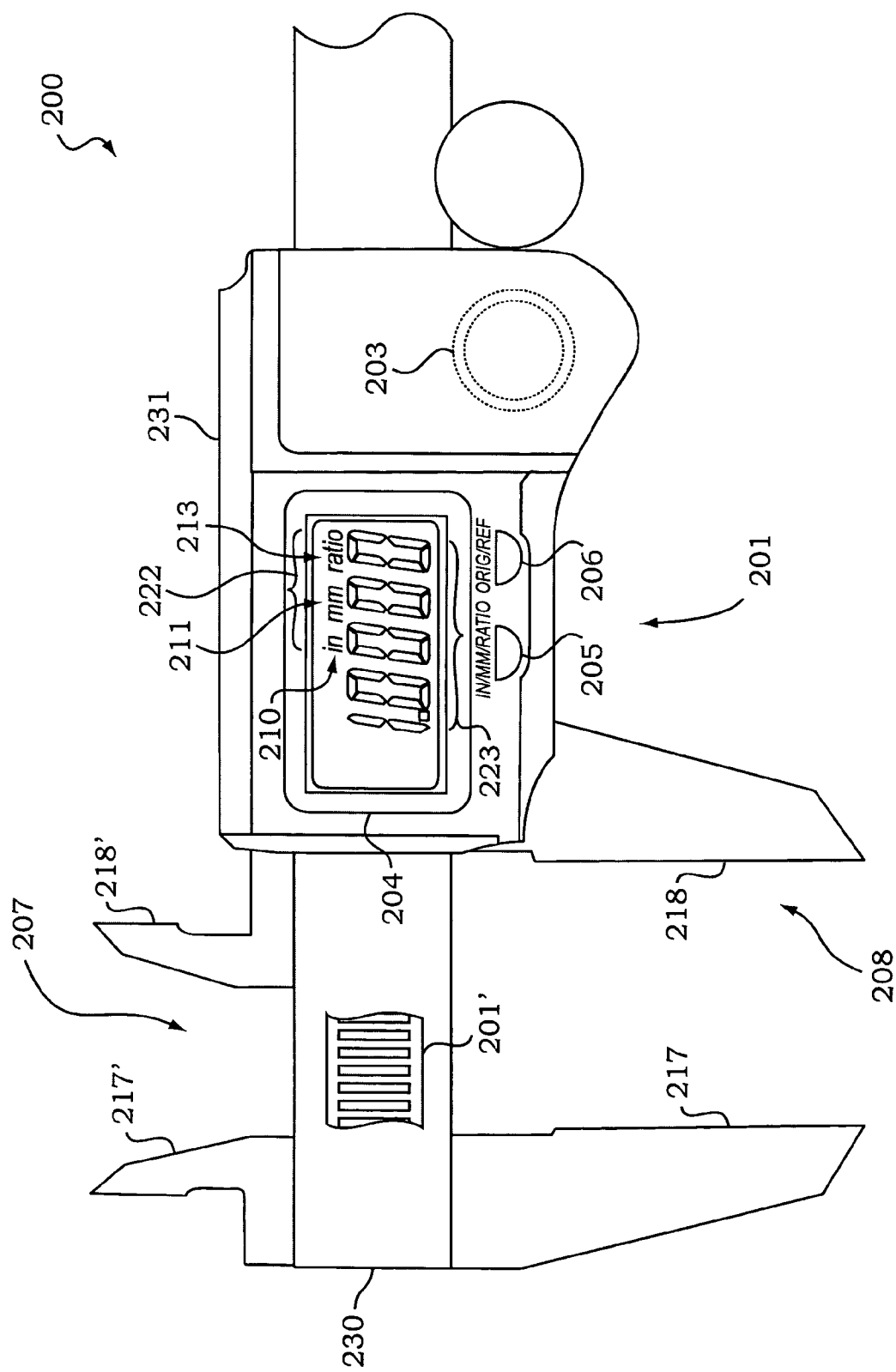
FIG. 2 is an illustration showing a portion of a first embodiment of a multimode measuring instrument according to this invention.

FIG. 2 shows a portion of a first embodiment of a multimode measuring instrument 200 according to this invention, also referred to as a multimode caliper 200. The multimode caliper 200 includes a scale member 207 and a readhead member 208. The scale member 207 may be a conventional electronic caliper member comprising jaw portions 217 and 217' and a spar portion 230 carrying a transducer scale 201', a portion of which is "revealed" in FIG. 2. The readhead member 208 may be a conventional electronic caliper member including jaw portions 218 and 218', and a guide and mounting portion that aligns and guides the readhead member along the spar 230 and carries a readhead assembly 201. The guide and mounting portion underlies the readhead assembly 201 as shown in FIG. 2, and is approximately the same size. In the embodiment shown in FIG. 2, the readhead member 208 carries a transducer readhead assembly 201, also referred to simply as readhead assembly 201, which includes a display 204, a power supply battery 203 (located internally and shown in dashed outline), a mode selecting button 205, and an origin/reference dimension selecting button 206. In the context of describing the features or operation specific to the ratiometric operating mode herein, the origin/reference dimension selecting button 206 may also be referred to simply as the reference dimension selecting button 206. The readhead assembly 201 also includes a transducer readhead (not shown) that is operable to provide signals indicative of the position of the transducer readhead assembly 201 along the transducer scale 201', and a signal processing and control unit (not shown), as previously outlined with reference to FIG. 1.

The display 204 generally comprises a numerical measurement display portion 223 and a mode indicator display portion 222. The display may be a custom LCD display, a dot matrix display, or any other type of display capable of displaying the type of information described herein. In the embodiment shown in FIG. 2, the display 204 illustrated is a custom liquid crystal display (LCD) including a numerical measurement display portion 223 capable of displaying approximately five digits, and a mode indicator portion 222. It should be appreciated that the numerical measurement display portion 223 will generally include at least seven segments at the location of each digit, and more than one usable decimal point location, as illustrated for the numerical measurement display portion 523 shown in the enlarged display illustration in FIG. 5. FIGS. 2-4B do not show such segments to avoid cluttering the display illustration. However, such additional segments may be understood to be present, in general.

The mode indicator portion 222 is capable of displaying conventional measurement mode/unit indicators, "in" mode indicator 210 and "mm" mode indicator 211, which indicate units of inches and millimeters respectively, and a ratiometric measurement mode indicator, "ratio" mode indicator 213. These indicators may take any convenient written or symbolic form and are not restricted to the exemplary "in", "mm", and "ratio" forms and names conveniently assigned here. It should be appreciated that the conventional measurement units of inches or millimeters are exemplary only, and not limiting. More generally, the conventional measurement mode(s) may display measurements in any desired conventional or predetermined units, and may have corresponding indicators.

The mode selecting button 205 allows the user to select the operating mode and/or units of measurement displayed by the multimode caliper 200. In one embodiment, the user may cycle through the modes by repeatedly activating (pressing) the mode selecting button 205. When the "in" mode indicator 210 is active, the measuring instrument 200 is in "inches" mode, and the value displayed on the numerical measurement display portion 223 is in units of inches. When the "mm" mode indicator 211 is active, the measuring instrument 200 is in "millimeter" mode, and the value displayed on the numerical measurement display portion 223 is in units of millimeters. When the "ratio" mode indicator 213 is active, the multimode caliper 200 is in "ratio" mode, and the value displayed on the numerical measurement display portion 223 is a number which is a ratio of a current distance between the relatively moveable members 217 and 218 to a reference distance between the relatively moveable members 217 and 218, as described in greater detail below.

To obtain a measurement of an object while in the "inches" or "millimeter" mode, the user separates the jaw portions 217 and 218 to a desired distance, such that their respective "measuring edges" contact the measurement object. Generally, the numerical measurement display portion 223 displays the distance between the measuring edges of the relatively moveable members 217 and 218 in contact with the measuring object. In many conventional electronic calipers, an origin or "zero" button can be pressed with the jaw portions at a selected separation or offset distance. Thereafter, that offset distance is subtracted from the measured distance, prior to display. In various exemplary embodiments according to this invention, the origin/reference dimension selecting button 206 may provide the previously described function when the caliper is operating in a conventional measurement mode, and a different function, a reference dimension function, when the caliper is operating in a ratiometric measurement mode.

If the user wishes to obtain a ratiometric measurement of an object dimension, expressing a current dimension in proportion to a reference dimension, after entering the ratiometric measurement mode, the user first separates the relatively moveable members 217 and 218 to a desired reference distance or dimension, for example to match a dimension of a 3-dimensional object, or a dimension of an illustrated part or object, or the like, and activates the origin/reference dimension selecting button 206. The separation between the measuring edges of the relatively moveable members 217 and 218 is defined as the reference dimension "$X_{ref}$" and stored in memory by the signal processing and control unit 102. Alternatively, in some embodiments, the signal processing and control unit 102 is connected such that a user may set the reference dimension $X_{ref}$ by means of a remote console connected to the external data interface 108 (shown in FIG. 1). After the reference dimension is stored in memory, any subsequent readout on the numerical display 204 while operating in the ratiometric mode will equal the current measurement distance "$X_{curr}$" divided by the reference dimension $X_{ref}$.

As one example illustrating of the intuitive and useful operation of this mode, a user may wish to estimate the value of a point included on a graph. The user would first match the measuring edges of the jaw portions 217 and 218 to the dimension of the "100%" scale graduation mark on the graph axis, and activate the origin/reference dimension selecting button 206, thereby saving the reference dimension $X_{ref}$ in memory. The user would then match the measuring edges of the jaw portions 217 and 218 to the separation between any other graph point and the "zero" axis, or match the measuring edges to the separation between any two points along the calibrated direction, which automatically establishes that separation dimension as $X_{curr}$. The ratiometric measurement "$X_{ratio}$", ratio of the current dimension $X_{curr}$ to the reference dimension $X_{ref}$ is displayed on the numerical measurement display portion 223, that is:

$$X_{ratio} = X_{curr}/X_{ref} \qquad (Eq. 1)$$

Figure 3A:
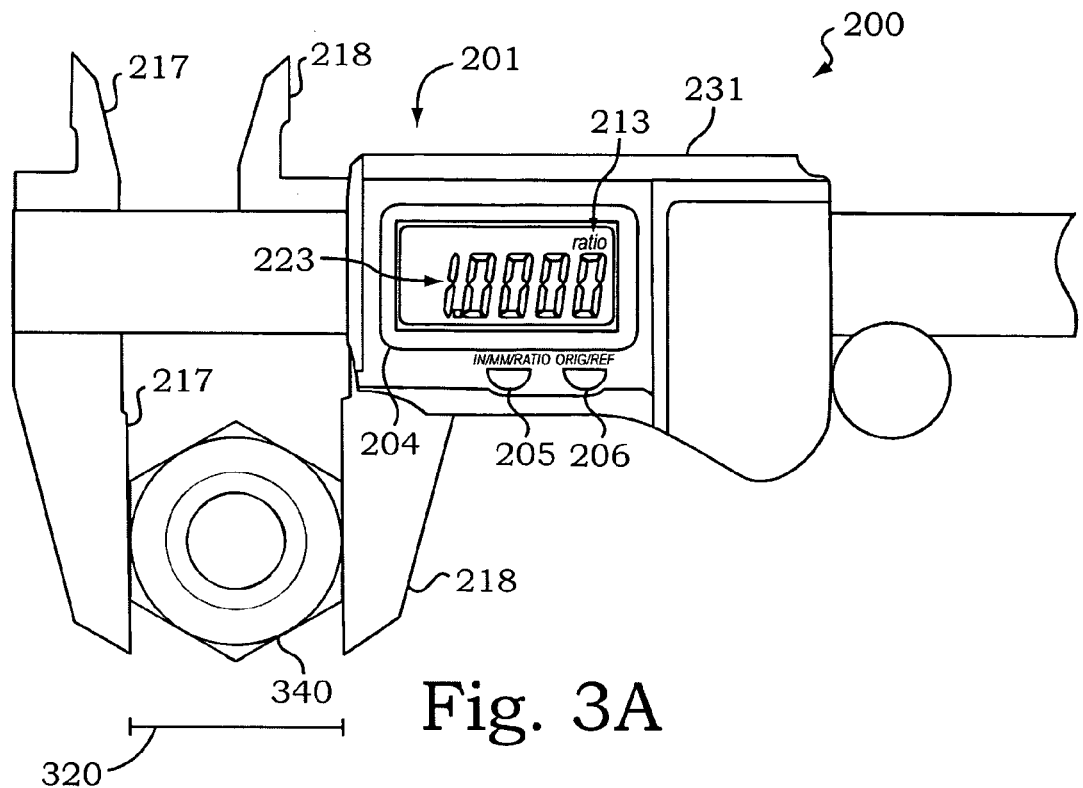
FIGS. 3A and 3B are illustrations showing an exemplary first set of operations that perform a first measurement in a ratiometric mode of operation according to this invention.
Figure 3B:
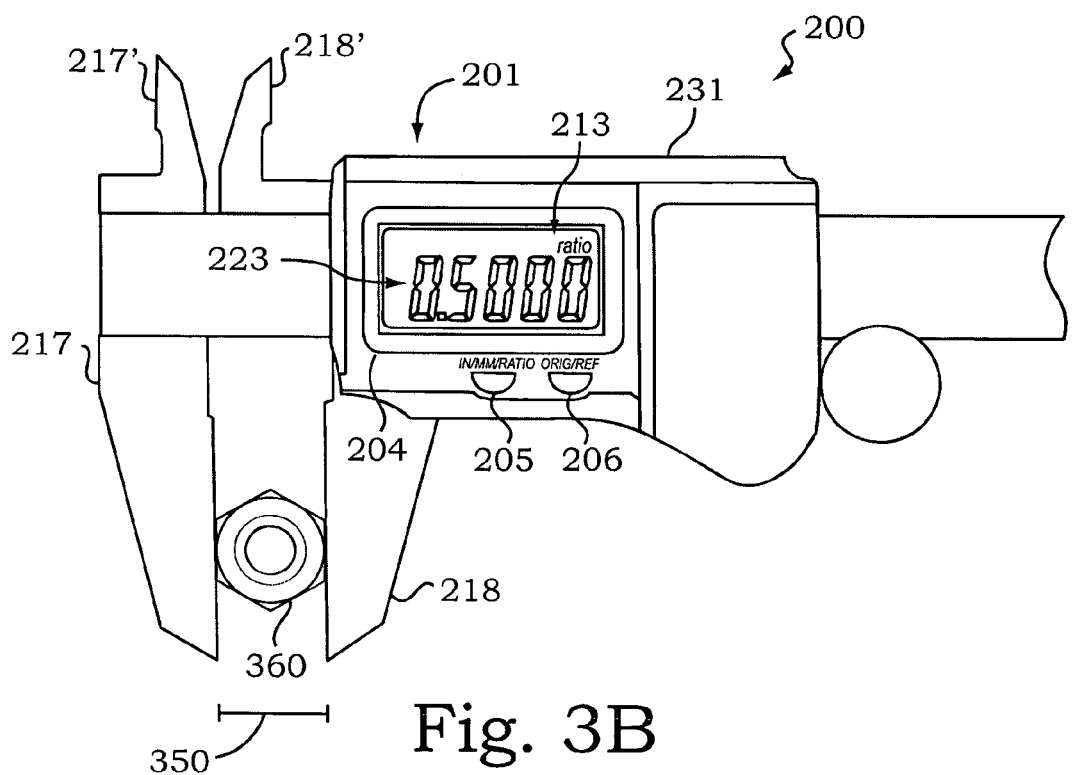

FIGS. 3A and 3B are illustrations showing an exemplary first set of operations that perform a first measurement in a ratiometric mode of operation according to this invention. Together with the set of operations shown in FIGS. 4A and 4B, these figures further clarify the ratiometric mode of operation of an electronic measuring device according to this invention. FIG. 3A shows the establishment of a reference dimension based on a first "large" object 340. As previously outlined, to establish a reference dimension, while in the ratiometric mode of operation, the user matches the measuring edges of the jaw portions 217 and 218 to a desired dimension, in this case the dimension 320 of the large object 340, and activates (presses) the origin/reference dimension selecting button 206. The separation between the measuring edges is defined as the reference dimension $X_{ref}$ and stored in memory by the signal processing and control unit 102. The numeric display portion 223 immediately displays the ratio of the current measurement $X_{curr}$ to the reference dimension $X_{ref}$. Since these dimensions are initially the same (until the jaw portions 217 and 218 are moved), the value "1.0000" is displayed, as shown in FIG. 3A.

FIG. 3B shows a ratiometric measurement according to this invention, for a second "small" object 360 in comparison to the reference dimension established for the first large object 340, as described above. In operation, if not already in the ratiometric mode of operation, the user activates the ratiometric mode of operation by pressing the mode selecting button 205. The display immediately and continuously displays any current position (current dimension), defined by the separation of the jaw portions 217 and 218, in proportion to the reference dimension. FIG. 3B shows the state of the multimode caliper 200 after a user has matched the measuring edges of the jaw portions 217 and 218 to an illustrated dimension 350 of the small object 340, that is one half of the reference dimension 320 established by the first large object 340, as described above. Thus, the numeric display portion 223 immediately displays the ratio of the current measurement $X_{curr}$ to the reference dimension $X_{ref}$ as "0.5000". Of course, the user knows that this is a ratiometric measurement due to the display of the "ratio" mode indicator 213.

Figure 4A:
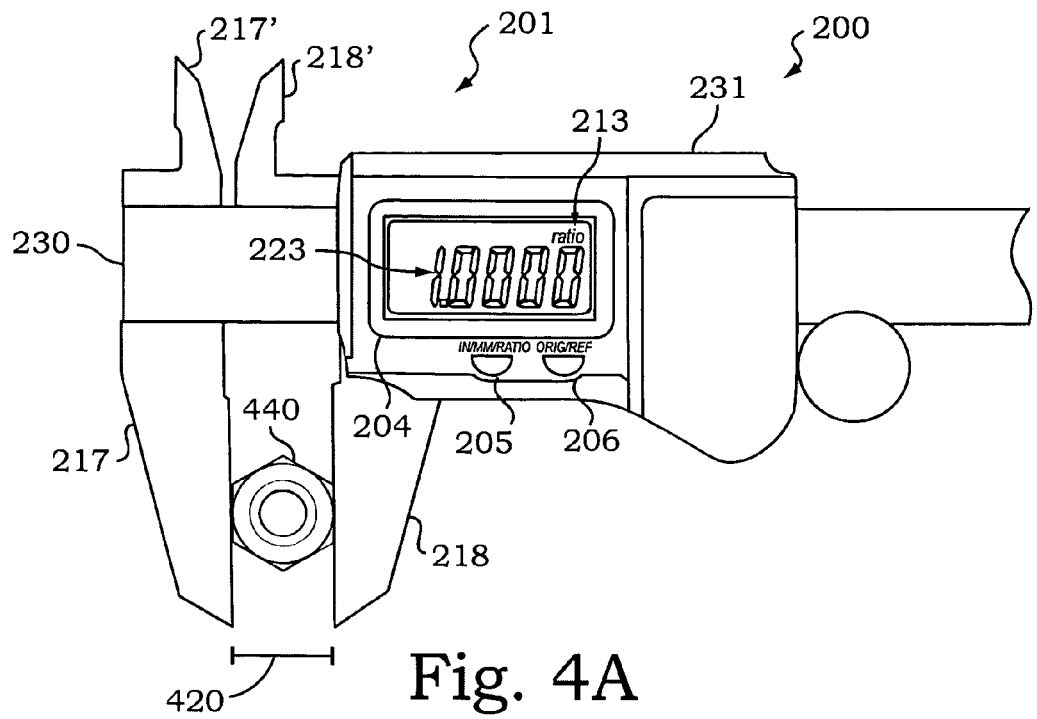
FIGS. 4A and 4B are illustrations showing an exemplary second set of operations that perform a second measurement, contrasting with the first measurement shown in FIGS. 3A and 3B, in a ratiometric mode of operation according to this invention.
Figure 4B:
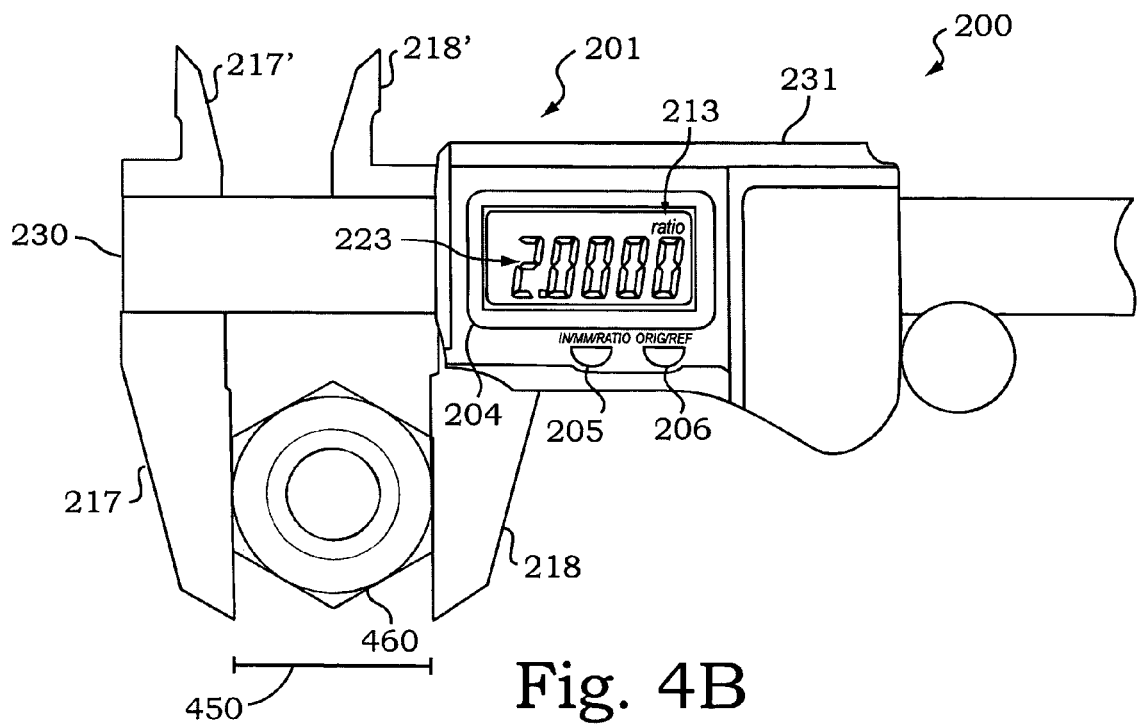

FIGS. 4A and 4B are illustrations showing an exemplary second set of operations that perform a second measurement, contrasting with the first measurement shown in FIGS. 3A and 3B, in a ratiometric mode of operation according to this invention. FIG. 4A shows the establishment of a reference dimension based on a "small" object 440. As previously outlined, to establish the reference dimension, while in the ratiometric mode of operation, the user matches the measuring edges of the jaw portions 217 and 218 to the desired dimension, in this case the dimension 420 of the "small" object 440, and activates (presses) the origin/reference dimension selecting button 206. The separation between the measuring edges is defined as the reference dimension $X_{ref}$ and stored in memory by the signal processing and control unit 102. The numeric display portion 223 immediately displays the ratio of the current measurement $X_{curr}$ to the reference dimension $X_{ref}$. Similar to the previous description with reference to FIG. 3A, since these dimensions are initially the same (until the jaw portions 217 and 218 are moved), the value "1.0000" is displayed, as shown in FIG. 4A. This will be the case immediately after establishing any reference dimension.

FIG. 4B shows a ratiometric measurement according to this invention, for a "large" object 460 in comparison to the reference dimension established for the small object 440, as described above. In operation, if not already in the ratiometric mode of operation, the user activates the ratiometric mode of operation by pressing the mode selecting button 205. The display immediately and continuously displays any current position (current dimension), defined by the separation of the jaw portions 217 and 218, in proportion to the reference dimension. FIG. 4B shows the state of the multimode caliper 200 after a user has matched the measuring edges of the jaw portions 217 and 218 to an illustrated dimension 450 of the large object 460, that is twice the reference dimension 420 established by the small object 440, as described above. Thus, the numeric display portion 223 immediately displays the ratio of the current measurement $X_{curr}$ to the reference dimension $X_{ref}$ as "2.0000". Of course, the user knows that this is a ratiometric measurement due to the display of the "ratio" mode indicator 213.

If the user activates the reference dimension selecting button 206 while the jaw portions 217 and 218 are effectively closed, such that $X_{curr}=0$, the value of $X_{ratio}$ as determined by Equation 1 will be undefined. This may be prevented by disallowing any operation which assigns $X_{ref}=0$. For example, the signal processing and control unit 102 may be programmed such that if the user presses the reference dimension setting button 206 when the jaw portions 217 and 218 are positioned such that $X_{curr}=0$, the display 204 will display an error message by activating whatever elements of the display can be readily interpreted as an error message. For example, "REF__0" may be displayed in the numeric display portion 223, or the numeric portion may blink "00000" instead of displaying the ratiometric value of 1.0000 that is generally expected immediately after pressing the reference dimension selecting button 206.

More generally, for a multimode measuring instrument 100 according to this invention, the user would only be able to set the reference dimension $X_{ref}$ if the measured reference dimension (the separation between the jaw portions 217 and 218, for example) is greater than a predefined minimum value $X_{min}$. The most suitable value of $X_{min}$ may be determined according to according to the properties of the display 104, the transducer 101, or other elements of the multimode measuring instrument 100 that may limit ability of the instrument to provide a ratiometric measurement display value that meets predetermined criteria for resolution and accuracy.

Additionally, even if $X_{ref}$ is measured and stored, if the ratio of $X_{curr}$ to $X_{ref}$ is sufficiently small, the value of $X_{ratio}$ may require a greater display resolution than is available from the numerical display portion in order to display non-zero digits. If the number of leading zeros in $X_{ratio}$ is greater than the number of zeros which a numerical display portion is capable of displaying, the displayed value of $X_{ratio}$ may be set equal to zero. Alternatively, small-valued ratiometric measurements may be displayed in a signed exponent notation. For example, using a six-digit segmented numeric display portion, a value such as 3.68E-5 may be displayed.

Similarly, if the ratio of $X_{curr}$ to $X_{ref}$ is sufficiently large, displaying the value of $X_{ratio}$ may require more digits than a numerical display portion 223 is able to display. If the value of $X_{ratio}$ is greater than a predefined value $X_{max}$, the display 204 may display an error message by activating whatever elements of the display can be readily interpreted as an error message. The most suitable value of $X_{max}$ may be determined according to the properties of the display 104, the transducer 101, or other elements of the multimode measuring instrument 100 that may limit ability of the instrument to provide a ratiometric measurement display value that meets predetermined criteria for resolution and accuracy. Alternatively, large-valued ratiometric measurements may be displayed in a signed exponent notation. For example, using a six-digit segmented numeric display portion, a value such as 1.72E__5 may be displayed.

A multimode measuring instrument according to this invention may use a transducer that is an incremental-type transducer, that is, a transducer in which the signal cycles arising from a periodic scale must be accumulated in order to measure dimensions or displacements that exceed one wavelength of the periodic scale. If such an instrument also allows setting a measuring origin at an arbitrary offset dimension in the conventional measurement mode(s), as previously described, then it is generally necessary to establish and store a separate origin for the ratiometric measurement mode. In the ratiometric measurement mode, for most applications, and generally for intuitive interpretation of a displayed ratiometric measurement, it is generally desirable for the origin to correspond to a dimension of zero (for example, corresponding to fully closing the jaw portions 217 and 218, of the multimode caliper 200). Thus, it may be necessary to zero the instrument (that is, establish the origin at zero) while in the ratiometric measurement mode, before establishing a reference dimension and performing measurements in the ratiometric mode. In one embodiment, the user would use the reference dimension selecting element 106 (for example, the origin/reference dimension selecting button 206 in the multimode caliper 200) to zero the measuring instrument for the ratiometric measurement mode. To illustrate, for the multimode caliper 200, while in ratiometric measurement mode the user would bring together the measuring edges of the jaw portions 217 and 218 such that there is zero separation between them. Next, the user would depress the reference dimension selecting button for at least a specified length of time which is significantly longer than the amount of time required to press the button when setting the reference dimension, such that a user will not inadvertently confuse the two operations, or accidentally zero the measuring instrument when zeroing is not intended.

It should be appreciated that the need to include special features or methods for setting an original specifically for the ratiometric mode may be avoided when a multimode measuring instrument according to this invention uses an absolute measurement transducer, that is, a transducer that outputs a unique measurement value for each dimension measurable by the transducer. For example, such transducers are described in U.S. Pat. Nos. 5,023,559 and 5,053,715 and 6,329,813, which are incorporated herein by reference in their entirety. Such transducers may provide a consistent and reliable "zero" position at all times, eliminating the need for the previously described "origin setting" operations in a ratiometric operating mode. Furthermore, absolute transducers may provide unique and reliable measurement values at all possible measurement positions at all times. Thus, when a multimode measuring instrument according to this invention includes an absolute measurement transducer, it is particularly convenient to set a reference dimension at a desired value in terms of conventional measurement units as an alternative to setting a reference by matching the measuring edges, or the like, to a particular dimension on an object or drawing, as previously described. An incremental transducer which has been zeroed in the closed jaw position, as described previously, may also be conveniently used to set a reference dimension at a desired value in terms of conventional measurement units.

One way of conveniently facilitating such an alternative way of setting the reference dimension is to provide a second recognizable signal from the reference dimension selecting button 206 while in the ratiometric operating mode, to activate operations in the signal processing and control unit that provide behavior according to the following description. A user may enter the ratiometric mode of operations as previously described and, for example, "double click" the reference dimension selecting button 206, in order to provide a second recognizable signal (in addition to the "first" single-press signal previously described for setting the reference dimension.) The "double click" (or other recognizable signal) causes the signal processing and control unit to display a current measurement position in absolute measurement units, for example millimeters, while in the ratiometric mode of operation. This "sub-mode" of the ratiometric mode of operation may be conveniently indicated to the user by displaying the "mm" indicator 211 and the "ratio" indicator 213 simultaneously. Then the user may set the measurement edges of the jaw portions 217 and 218 at a desired absolute dimension based on the absolute measurement value displayed on the numeric display portion 223, and press the reference dimension selecting button 206 a single time (providing the customary "first" signal), in order to set the reference dimension as previously described and immediately turn off the "mm" indicator 211 (to display only the "ratio" indicator 213), and immediately change to displaying a current measurement position in the customary manner previously described for the ratiometric measurement mode.

Figure 5:
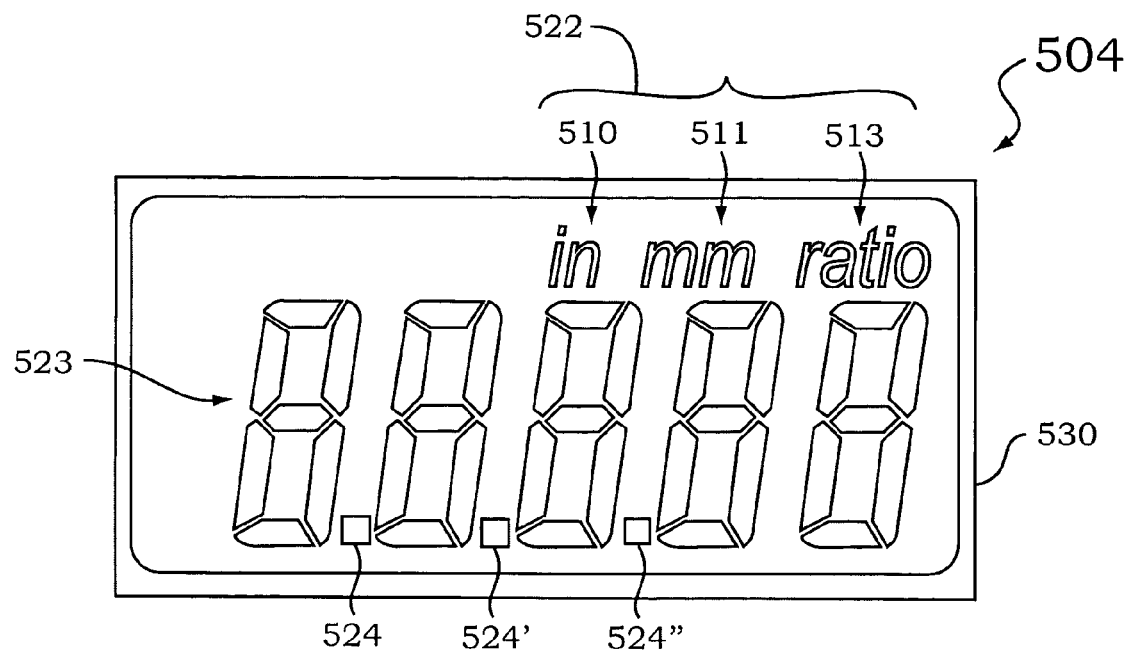
FIG. 5 is an illustration showing a detail of the display portion of a first embodiment of the invention shown in FIG. 2.

FIG. 5 shows a detailed view of one exemplary display 504, that is usable in various embodiments according to this invention. In one embodiment, the display 504 is used as the display 204, shown in FIG. 2. The display 504 comprises a numerical display portion 523 that includes five seven-segment numerical indicators and three alternately selectable decimal point elements 524, 524' and 524". The display 504 also includes a mode indicator display portion 522 that includes three mode indicators 510, 511, and 513, similar to the mode indicators 210, 211 and 213 described previously. It should be appreciated that, more generally, such a display may contain any reasonable number of multi-segment or other style indicators that is compatible with number-size requirements (for readability) and a desired overall size for the display.

Figure 6:
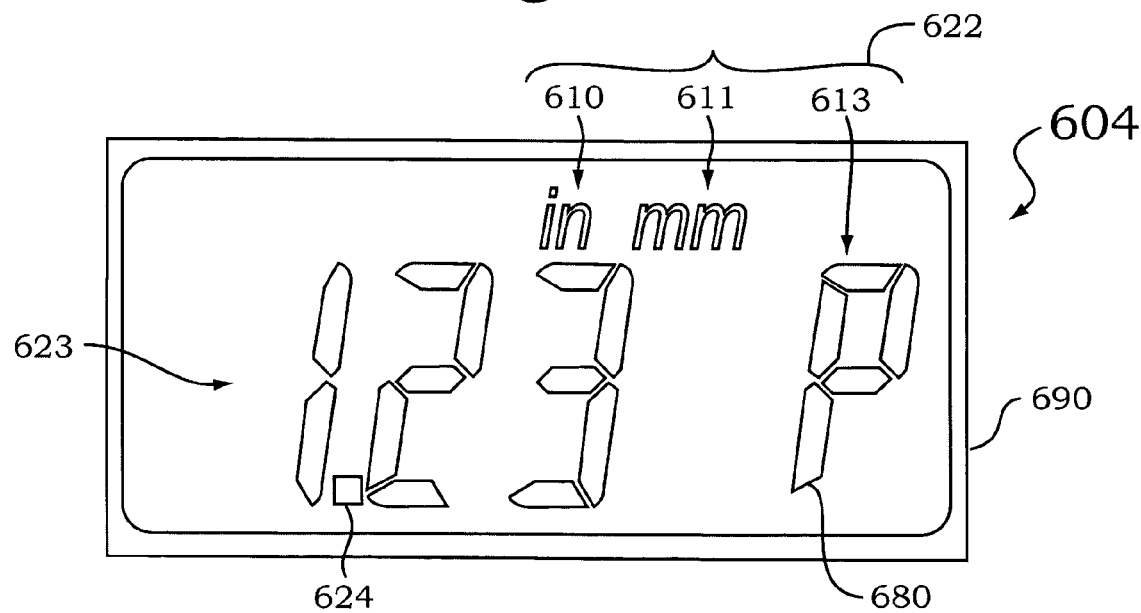
FIG. 6 is an illustration showing a detail of the display portion of a second embodiment of the invention shown in FIG. 2.

FIG. 6 shows a conventional display 604, similar to a display currently used in commercially available electronic calipers that operate in the conventional mode. The embodiment of the conventional display 604 shown in FIG. 6 should be understood to include elements identical to those included in the display 504 shown in FIG. 5, with the exception that no individual "ratio" mode indicator is provided. Various segments of the seven-segment indicators, and two decimal points, are included in the numeric display portion 623 but not illustrated in FIG. 6, in order to illustrate more clearly how a ratiometric measurement, and a symbol usable to indicate the ratiometric mode of operation, may be provided by the conventional display 604. Despite the lack of an individual "ratio" mode indicator, the conventional display 604 may be operated to provide any of the functions previously described during ratiometric mode operations. Quite simply, as shown in FIG. 6, when operating in the ratiometric mode, the last seven-segment indicator 680 of the numeric display portion 623 is used to display a symbol indicative of the ratiometric mode in any operating situation where the individual "ratio" mode indicator was displayed according to previously described embodiments. For example, the symbol might be a "P" as shown in FIG. 6 (a user might be taught to think of "P" as standing for "Proportion", since the words proportion and ratio indicate a similar concept.) However, any other appropriate symbol might be used. If one seven-segment indicator is not used, in order to isolate and emphasize the ratiometric mode indicating symbol of the seven-segment indicator 680, as shown, then ratiometric measurement values such as 0.01, 5.32, 54.6, 99.9, and 999, for example, may be displayed. If additional ratiometric measurement display range or resolution is desired, the display may be configured to include more seven-segment indicators and decimal points. However, it should be appreciated that the range of ratiometric values that may be represented by the illustrated conventional display 604 is sufficient for many applications, and the resolution of any displayed value may be within approximately 1% of the displayed value or better, which is a resolution and accuracy that is more than sufficient for most ratiometric measurement applications. Thus, it should be appreciated that existing types of electronic measuring instrument displays may be used to provide a multimode measuring instrument according to this invention. Accordingly, some existing commercially available electronic calipers, or the like, may be retrofitted to provide a ratiometric multimode measuring instrument according to this invention that operates as previously described, by using only software or firmware changes.

It should be appreciated that the previously described exemplary embodiments are illustrative only, and not limiting. For example, the mode selecting element 105 and the reference dimension selecting element 106 may comprise the same physical element activated to provide different codes or signals. They may be implemented, for example, using a single button. The single button may be pressed in various manners to provide various signals that have recognizable durations and/or patterns usable to activate the desired operations of the signal processing and control unit 102. Alternatively, a simple voice-activated circuit may be used.

Furthermore, although the ratiometric measurement mode operations described above have characteristics that are particularly well-suited to being combined in the most efficient way possible with conventional caliper operations, or the like, it should be appreciated that the ratiometric measurement can be enhanced and/or used in various other ways. For example, the ratiometric measurement can be displayed as a % of the reference dimension, an element can be provided to activate operations that invert the ratiometric measurement (that is, the operation $1/X_{ratio}$ can be performed) and display the inverted value and a corresponding "invert" indicator. Such an inverted value may be useful in certain applications. Furthermore, the ratiometric measurement operations disclosed herein may also be used as the sole operating mode of a ratiometric measuring instrument, if desired. Thus, while various preferred and exemplary embodiments of the invention have been illustrated and described, it will be appreciated that various changes can be made therein without departing from the spirit and scope of the invention.

The embodiments of the invention in which an exclusive property or privilege is claimed are defined as follows:

1. A multimode measuring instrument including:
   a user interface for performing a ratiometric measurement, the user interface comprising
   a user-operated mode selecting arrangement operable to select a ratiometric measurement mode as a current mode of operation;
   a signal processing and control portion;
   a user-operated reference-dimension setting element operable during the ratiometric measurement mode of operation to cause the signal processing and control portion to set a ratiometric reference dimension based on a relationship between two relatively moveable members of the measuring instrument at the time the reference-dimension setting element is operated; and
   a numeric measurement indicating portion, wherein:
   the multimode measuring instrument is one of (i) a linear measuring instrument wherein the ratiometric reference dimension corresponds to a distance between the two relatively moveable members of the measuring instrument at the time the user-operated reference-dimension setting element is operated, and (ii) an angular measuring instrument wherein the ratiometric reference dimension corresponds to an angle between the two relatively moveable members of the measuring instrument at the time the user-operated reference-dimension setting element is operated;
   the ratiometric measurement mode operates such that when a set of operations consisting of setting the ratiometric reference dimension and selecting the ratiometric measurement mode as the current mode of operation is performed, then a ratiometric number equivalent to dividing the dimension corresponding to a current separation between the two relatively movable members of the measuring instrument by the ratiometric reference dimension is automatically displayed using the numeric measurement indicating portion; and the user-operated reference-dimension setting element is a switch element that consists of one of a button, a miniature touch screen element, and a voice activated control circuit, and the user-operated reference-dimension setting element is operable by a single user operation consisting of activating the switch element a single time, in order to cause the signal processing and control portion to set the ratiometric reference dimension.

2. The multimode measuring instrument of claim 1, wherein the signal processing and control portion operates automatically and continuously to cause the numeric measurement indicating portion to display an updated value of the ratiometric number whenever the current mode of operation is the ratiometric measurement mode, the ratiometric reference dimension has been set, and the current separation between the two relatively movable members of the measuring instrument is changed.

3. The multimode measuring measuring of claim 1, wherein:

whenever the current mode of operation is the ratiometric measurement mode and the ratiometric reference dimension has been previously set, the signal processing and control portion operates to automatically replace the previous ratiometric reference dimension with a new ratiometric reference dimension whenever the user operates the user-operated reference-dimension setting element by the single user operation.

4. The multimode measuring instrument of claim 3, wherein:

the user-operated mode selecting arrangement is operable to select one of the ratiometric measurement mode of operation and a conventional measurement mode of operation as the current mode of operation, wherein in the conventional measurement mode the numeric measurement indicating portion displays one of a number corresponding to conventional length units if the device is a linear measuring device and a number corresponding to conventional angle units if the device is an angular measuring device;

in the conventional measurement mode the user-operated reference-dimension setting element is operable by the single user operation, in order to cause the signal processing and control portion to set a zero reference dimension, wherein the same user-operated reference-dimension setting element is used in both the conventional measurement mode and the ratiometric measurement mode; and when the current mode of operation is the conventional measurement mode and the zero reference dimension has been set, then the numeric measurement indicating portion displays a number corresponding to difference between a dimension corresponding to a current separation between the two relatively movable members of the measuring instrument and the zero reference dimension.

5. The multimode measuring instrument of claim 4, wherein the multimode measuring instrument includes an absolute measurement transducer.

6. The multimode measuring instrument of claim 4, wherein:

the user-operated mode selecting arrangement consists of one of a button, a miniature touch screen element, and a voice activated control circuit;

the instrument includes no more than one numeric measurement indicating portion; and the signal processing and control circuit operates to display a single numeric measurement value at a time on the one numeric measurement indicating portion and to automatically change the displayed numeric measurement value, and a mode of operation indicator, when the user operates the user-operated mode selecting arrangement to change the current mode of operation.

7. The multimode measuring instrument of claim 4, wherein the multimode measuring instrument is a caliper that provides linear measurements.

* * * * *